Aug. 3, 1937.　　　L. W. WEESNER　　　2,089,156
ARTIFICIAL FISHING BAIT
Filed April 11, 1934

INVENTOR
Lehn W. Weesner
BY
Wood & Wood
ATTORNEYS

Patented Aug. 3, 1937

2,089,156

UNITED STATES PATENT OFFICE 2,089,156

ARTIFICIAL FISHING BAIT

Lehn W. Weesner, Cincinnati, Ohio, assignor to The Weezel Bait Company, Cincinnati, Ohio, a corporation of Ohio Application April 11, 1934, Serial No. 720,018

6 Claims. (Cl. 43—42)

This invention relates to artificial bait for fishing, and more particularly to that type of artificial bait which is adapted to be cast or used in trolling.

It is an object of this invention to provide an improved artificial fishing bait which is designed to simulate a minnow, and which gives the appearance of life, embodying for this purpose a novel arrangement of feathers.

It is another object of this invention to provide an artificial bait of this character resembling a minnow, which incorporates a head structure which causes the bait to dart from side to side and in this respect, in addition to its appearance of life, suggests the action of a minnow.

It is a further object to provide a bait in which is incorporated a device which will rotate rapidly when drawn through the water and as placed in front of the feathered bait, will accentuate the like-life appearance of the bait by a pulsating dilating quivering action of the feathers.

It is a still further object to provide a bait of this character in which parts are interchangeable, that is to say, by means of which the bait can be caused to make fairly wide lateral swings, and at the same time keep close to the surface of the water, or which will be usable, at the option of the user, with the whirling or spinning device for steadying the movement of the bait and causing a quivering and dilating action of the feathers.

Other objects and further advantages will be more fully apparent from a description of the accompanying drawing, in which.

Figure 1:
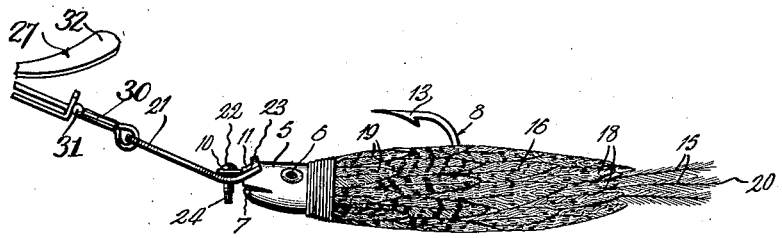
Figure 1 is a side elevation of the improved bait with the deflector or elevating plate in position.
Figure 2:
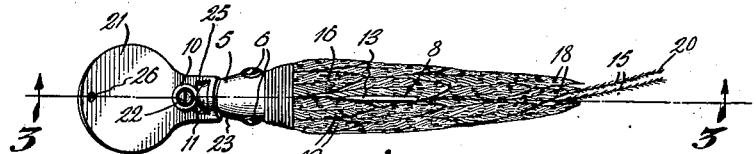
Figure 2 is a top plan view of Figure 1.

The artificial bait herein disclosed is constructed of lead and feathers. The lead formed head 5 of the bait for simulating a minnow is appropriately decorated with eyes 6 and formed to include a mouth 7. The hook 8 for the bait has its shank 9 passing longitudinally through the head. Its eyelet end 10 is projected through the nose 11 for the attachment of a deflector plate or disc or a leader and spinner thereto. The customary fishing line (not shown) is attached to the deflector plate or the leader as the case may be. The rear end or barbed end 13 of the hook projects outwardly and forwardly in the usual manner. Initially, a bead of lead 14 is attached rigidly to the shank of the hook and the lead head is cast about this bead, whereby there is no chance for displacement of the hook.

The body of the artificial minnow is formed of two kinds of feathers. The interior feathers 15 are hackle or chicken feathers, whereas the outer feathers 16 are duck feathers, preferably mallard. The inner feathers are selected for length and are very slender. They are fastened to the hook by means of cord 17. The outer group of feathers is fastened to the head at the neck portion thereof. These outer feathers are selected and applied in the following manner:

Long feathers 18, not quite as long as the hackle feathers, are first placed around the neck and completely encircle the body. Thereafter shorter sets of feathers are used, superimposed on the first until finally shoulder feathers 19 are used which have very little length. It will be seen that this arrangement of the feathers permits a great deal of movement and the body of the artificial minnow can dilate under a whirling action imparted from the front thereof, the feathers pulsating or quivering under the action of the spinner. The inner feathers project out and give the appearance of a tail 20 when the device is in motion.

For one use of the bait, a deflector disc or plate 21 is provided. This plate is inclined forwardly upwardly. It is fastened to the eyelet by means of a special screw 22 passed loosely through the eyelet and screwed through the tail portion of the plate. The tail portion or rearward extension of the plate includes a bridge portion or strap 23 which lies across the nose of the minnow. This steadies the plate in position on the minnow, and prevents any rotation on the screw.

The screw, as stated, is special. It has been found that these screws since they are very tiny and the threads very fine are difficult to place in position. Accordingly, a counterturned unthreaded pilot tip 24 is provided. This centers the screw in the hole in the plate for insertion and it is readily possible to start the screw.

The extension of the disc is apertured as at 25 between the bridge and the screw-threaded aperture, whereby the plate can be inserted over the eyelet of the hook, disposing the plate against the underside of the eyelet with the bridge disposed over the nose of the head. This plate or disc includes an aperture 26 at its forward end for the attachment of a leader or line thereto, whereby the bait can be cast or drawn through the water.

The action of the bait when drawn through the water is sinuous, that is to say, the bait weaves back and forth laterally as a result of the pressure of the inclined plate against the water. This plate elevates the bait tending to keep it fairly close to the surface. It will be appreciated that the bait is weighted by means of the lead head and would sink deep in the water if it were not for the elevating effect produced by the plate.

Figure 3:
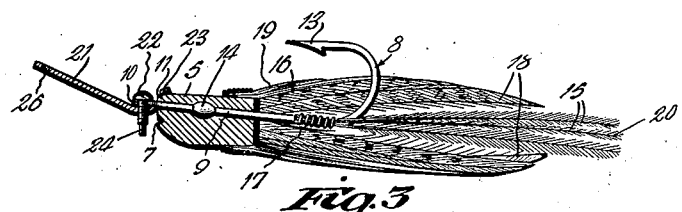
Figure 3 is a sectional view taken on line 3—3, Figure 2, illustrating the details of construction of the bait.
Figure 4:
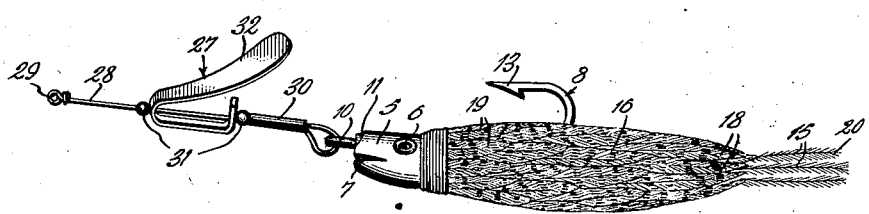
Figure 4 is a view showing the plate removed and the whirling or spinner attachment used in place thereof.

Now it is possible to attach a spinner device 27, shown in Figure 4, either to the plate when the plate is in position as indicated in Figure 3, or directly to the eyelet as shown in Figure 4. A leader 28 forms the rotative mounting of the spinner device. The wire length constituting the leader has one end bent to provide an eyelet 29 in the end thereof and a straight terminal reversely bent to lie along the length of the leader. A sleeve or tube 30 slidably mounted on the leader is slipped over the extended end thereof for locking the eyelet in position on the eyelet of the bait.

The spinner device is mounted between balls 31, 31, to rotate on the leader. This spinner is formed of a strip of metal. Its attached portion is of U-shape with the leader passing through the arms thereof. The forward arm is extended rearwardly in an arc to form a vane 32. The twisted metal forming the vane causes a whirling or rotative action as the spinner is pulled through the water.

This spinner device beside creating light flashes which attract the fish, causes a whirling action of the water about the bait. This disturbance draws the feathers outwardly, causing dilation of the mass of feathers. The action further induces a quivering and pulsating action of the feathers, thus making the bait appear to be alive.

Having described my invention, I claim:

1. In an artificial bait, a head, a hook on said head, feathers extended rearwardly from said head about said hook, an attachment eyelet extended forwardly from the nose of said head and positioned in advance thereof, a deflector disc lying in a plane angularly related to the general plane of said head and feathers and including a rearward extension having a bridge portion, said bridge portion lying over the nose of said head, and a screw extended through said eyelet into said extension.

2. In an artificial bait, a body, a hook on said body, an attachment eyelet extended forwardly from said body, a deflector disc lying in a plane angularly related to the general plane of said body and including an apertured extension having a bridge portion, said bridge portion lying over the forward end of said body, said extension lying against the underside of said eyelet, and a screw extended through said eyelet into said extension.

3. An artificial bait, comprising, a lead head, a hook secured through said head, having an eyelet end protruding from the nose of said head, feathers secured to said head and extended rearwardly therefrom, a deflector plate secured to said eyelet and extended angularly upwardly and a water driven device fixed in front of said plate for agitating the water about said feathers.

4. In an artificial bait, a head, a hook on said head, feathers extended rearwardly from said head, an attachment eyelet extended forwardly from the nose of said head, a deflector disc lying in a plane angularly related to the general plane of said head and feathers and including an apertured extension having a bridge portion, said bridge portion lying over the nose of said head, said extension lying against the underside of said eyelet, and a screw extended through said eyelet into said extension.

5. An artificial bait comprising a head including an attaching eyelet extending forwardly therefrom, a multiplicity of feathers secured to said head and extending rearwardly therefrom, a hook extending rearwardly from the head within the feathers, a deflector plate directly and rigidly secured to said eyelet and having a portion in abutment with the head for preventing swinging movement of the plate when attached to the eyelet, and a fastening element passing through the eyelet for detachably securing the plate to the eyelet and constituting a sole means for coupling and holding the plate in its position on the eyelet with respect to the head.

6. An artificial bait, comprising a head, a hook extending rearwardly from the head, a member secured to and extending forwardly from the head and formed with an eyelet, an angularly shaped plate disposed in advance of the head, and means separably securing the plate rigidly on the head, said means passing through said eyelet.

LEHN W. WEESNER.